United States Patent
Bailey

[15] 3,637,406
[45] Jan. 25, 1972

[54] ULTRAPURE ALUMINA CERAMICS FORMED BY COPRECIPITATION

[72] Inventor: Joseph T. Bailey, Hixson, Tenn.

[73] Assignee: American Lava Corporation, Chattanooga, Tenn.

[22] Filed: Dec. 23, 1970

[21] Appl. No.: 101,150

Related U.S. Application Data

[63] Continuation of Ser. No. 746,316, July 22, 1968, abandoned.

[52] U.S. Cl. ............................106/39 R, 23/141, 106/65, 264/60
[51] Int. Cl. .................................................C04b 33/00
[58] Field of Search ...............106/39 R, 65, 62; 23/141, 143; 264/65, 56, 60; 252/452

[56] References Cited

UNITED STATES PATENTS

| | | | |
|---|---|---|---|
| 2,780,558 | 2/1957 | Wilcox | 106/309 |
| 2,805,920 | 9/1957 | Richardson | 23/143 |
| 3,026,210 | 3/1962 | Coble | 106/39 R |
| 3,141,786 | 7/1964 | Bugosh | 106/62 |
| 3,264,124 | 8/1966 | Lauder et al. | 106/65 |
| 3,311,482 | 3/1967 | Klingler | 106/65 |
| 3,377,176 | 4/1968 | Wolkodoff et al. | 106/65 X |
| 3,459,564 | 8/1969 | Lachman | 106/39 R |
| 3,510,272 | 5/1970 | Schmank et al. | 23/141 X |

FOREIGN PATENTS OR APPLICATIONS

| | | | |
|---|---|---|---|
| 697,231 | 9/1953 | Great Britain | 106/62 |

*Primary Examiner*—James E. Poer
*Assistant Examiner*—W. R. Satterfield
*Attorney*—Kinney, Alexander, Sell, Steldt & Delahunt

[57] ABSTRACT

Alumina ceramics of homogeneous composition and fine-grained structure are produced using alpha-alumina obtained by calcination of aluminum oxide hydroxide including any desired adjuvants.

8 Claims, No Drawings

ULTRAPURE ALUMINA CERAMICS FORMED BY COPRECIPITATION

This application is a continuation-in-part of copending application Ser. No. 746,316 filed July 22, 1968, now abandoned.

This invention relates to the production of ceramics of alpha-alumina of extremely high purity containing no more than about a tenth of a percent of extraneous oxides, incorporated particularly as adjuvants to control grain-growth. The ceramics are otherwise substantially free of extraneous elements.

The production of special ceramics having utility for their hardness or refractory properties naturally suggests the use of alumina. Ceramics have been made from alumina including small amounts, usually of the order of 1–5 percent, of various other oxides added to assist in the bonding of particles. British Pat. No. 1,072,536 (corresponding to U.S. applications 416,138 and 416,139; the latter of which is now U.S. Pat. No. 3,377,176) describes alumina ceramics containing small amounts of added crystal growth inhibitors having grain size of about 2 to 5 microns and even only 2–3 microns which are asserted to contain only about 0.5 percent of other growth-inhibiting oxides and to be nominally 99.5 percent or better $Al_2O_3$.

The British patent does not indicate the source or actual purity of the alumina which was used. Such information is needed for a complete understanding of the disclosure because there are several different allotropic forms not only of alumina but also of mono- and trihydrates and various procedures yield somewhat different aluminas, as the field of catalysis recognizes.

Because of its refractory nature, the analysis of very pure alumina is extremely difficult. It is believed that spectroscopic methods can detect traces, of the order of 0.001 percent or even less, of alkali and alkaline earth oxides in alumina. However, the detection of silica is not readily possible by spectroscopic methods. These impurities are especially significant as they tend to form glassy phases which are detrimental to the achievement of outstanding properties. In any event, quantitative determination is difficult and ultrapure or high-purity alumina should preferably not contain detectable intrinsic amounts of alkali metal, alkaline earth or silicon oxides. Extrinsic amounts are those added for specific purposes in definite amounts, as for example, magnesia added to influence crystal growth.

Characterization of alumina ceramics heretofore available is difficult because the exact procedures for the measurement of properties are susceptible to errors which cannot be evaluated on the basis of reported results. Furthermore different methods of preparation tend to give somewhat different properties. The density of alpha-alumina is given in the Handbook of Chemistry and Physics as 3.97 g./cm.$^3$ although the value of 3.99 g./cm.$^3$ for 100 percent theoretical density given in the above British patent is also accepted. It will be seen that as an alumina ceramic approaches maximum density and purity extreme accuracy in the technique of measurement is necessary to permit comparison with other samples having properties measured with equal care. The presence of an adjuvant with high density, e.g., yttria with density of 5.0 may give a deceptively high value. Thus, comparison among materials of the British patent itself may be valid as to relative merits but comparison of merits of ceramics of the British patent and of other references cannot be predicated on different values either of percent of theoretical density or attained density without a more thorough analysis of the respective errors of measurement involved.

A major disadvantage in prior art processes for preparing high purity alumina ceramics is that desired adjuvants, particularly crystal-growth inhibitors, are incorporated by grinding together two or more solid phases. Grinding aids are often included but their precise function is obscure. When the adjuvant is a grain-growth inhibitor it is added in small to very small amount, for example, in the above noted British patent of the order of 0.5 percent by weight. Achievement of homogeneity is thus difficult and, quite probably, undeterminable. As the amounts of adjuvant are smaller the necessity for homogeneity increases if the smaller amounts are to benefit the entire ceramic mass. Naturally, the closest approach to the properties of completely pure alumina can only be achieved by minimization of adjuvants.

It is an object of this invention to produce ceramics consisting essentially of extremely high-purity alumina. Another object of this invention is to provide compositions useful for the production of fine-grained alumina ceramics having homogeneously dispersed adjuvants. Another object of this invention is to provide a process for minimization of amounts of adjuvants necessary to effect crystal-growth control. Other objects and aims will become evident from the present disclosure.

It has been found that the above and other objects of the invention are achieved by using alpha-alumina of a particular type.

The value of using alpha-alumina in ceramics as opposed to other allotropic forms is recognized in the art. A useful discussion of the properties of alumina and its allotropic forms as well as hydrates thereof is provided in Kirk-Othmer, Encyclopedia of Chemical Technology, 2nd edition, volume 2 pages 41–58.

The particular type of finely divided alpha-alumina useful in this invention is obtained by calcining of hydrates formed by hydrolysis of purified aluminum isopropoxide $Al(OC_3H_7)_3$. Such hydrates containing large amounts of calcia or magnesia are of pharmaceutical interest as antacids as described in U.S. Pat. No. 3,510,272. Calcination is effected at temperatures above about 1100° C. to about 1375° C. and preferably in the range of 1100° to 1350° C. This alpha-alumina is controllable to be of very high purity or to include minute amounts of homogeneously dispersed adjuvants such as crystal-growth inhibitors as described hereinbelow.

The properties of aluminum isopropoxide are reviewed in some detail in Kirk-Othmer, Encyclopedia of Chemical Technology, 2nd edition, volume 1. Aluminum isopropoxide is distillable and is therefore readily freed from such common nonvolatile impurities as silicon and iron oxides. One curious property is that it is acidic and reacts, for example, with magnesium isopropoxide to give a double isopropoxide. Other double salts of this type are also formed with alkali metal and alkaline earth isopropoxides, but pure aluminum isopropoxide is much more volatile than double compounds of it with alkali metal or alkaline earth isopropoxides and hence it is freed from them entirely by distillation. Hydrolysis of the pure distilled isopropoxide to aluminum oxide hydroxide, i.e., monohydrate of alumina, followed by calcination to about 1100° to 1300° C. normally gives alpha-alumina containing 0.003 percent or less of intrinsic impurities i.e., of a purity of the order of 99.998 percent or even 99.999 percent. It will be recognized that such purities are beyond the ability of accurate quantitative determination of impurities, even by spectroscopic means. The alpha-alumina may therefore be characterized as spectroscopically substantially pure or as having an intrinsic purity of 99.997 percent or better. This intrinsic purity applies, barring accidental contamination, even when adjuvants are added. Such alpha-alumina is especially useful for fabrication of ceramics of pure alumina, i.e., 99.9 percent and higher up to 99.99+% $Al_2O_3$. It will be recognized that absolutely pure alumina which for present purposes may be considered to be 100.000 percent, is substantially impossible. When the figure 100 percent is used it is considered that by convention this is substantially the same as 99.5+ percent.

It is convenient to have a term distinctive of alumina obtained as described from soluble organic compounds and particularly from the isopropoxide. In allusion to the process of preparation, such alumina is termed "desolubilized" alumina. Until calcined the product is considered to be a hydrated alumina. This type of alpha-alumina is economically very attractive as it can be produced at relatively reasonable prices. It is also found to be technologically very valuable as it can be produced to include desired amounts of inorganic oxides as adjuvants. Such adjuvants are present in effective amounts which may be less than the ranges of impurities in heretofore available ceramic grades of alumina.

Aluminum isopropoxide is soluble in certain organic solvents and then readily blends, and, as noted above, in some cases combines, in solution with desired adjuvants, or additives, such as magnesium yttrium, etc., added in the form of suitable soluble compounds. Additives of adjuvants, e.g., magnesium aluminum isopropoxide, are also incorporated readily in the solution with the aluminum isopropoxide in whatever amounts are desired. Preferred amounts of inorganic additives correspond to no more than 0.1 percent total of magnesia, or other crystal-growth-inhibiting oxides. Amounts of about 0.01 to 0.1 percent appear to be fully satisfactory. For high-purity alumina ceramics, the presence of only sufficient adjuvant to inhibit crystal-growth will provide mechanical, refractory and electrical properties most nearly approximating those of completely pure alumina. It is found that incorporation of magnesia by this method gives effective control of crystal growth at levels which are one-half or less of those necessary when magnesia is incorporated solely by ball milling. This effect appears to result from the complete homogeneity obtained. Alumina incorporating magnesia when prepared by this procedure might also be described as alumina including spinel as crystal-growth-controlling adjuvant although the presence of spinel as a phase may not be demonstrable. It appears also that there is less crystal growth during calcination so that the very fine particle size of the hydrated alumina is largely retained although there may be some agglomeration of particles during calcination which is readily broken down during subsequent processing. Crystal growth thus appears to be controlled and inhibited in the alpha-alumina ceramic base.

Several methods are available for conversion of aluminum isopropoxide to alpha-alumina. The same procedures are applicable when adjuvants are present and are coprecipitated with aluminum compounds. Insofar as is presently known the processes provide alpha-alumina of comparable properties.

Aluminum isopropoxide may be calcined directly to give alumina which crystallizes to the transition forms gamma and eta alumina at about 600° to 800° C. and at higher temperatures converts to alpha-alumina. This procedure is rather hazardous because of the flammable organic vapors produced.

Aluminum isopropoxide may be hydrolyzed by reaction with water, for example, by dropping a solution in isopropanol into a large volume of agitated water. The product from this reaction is alpha-aluminum oxide hydroxide, which is then dehydrated and calcined to alpha-alumina by heating at 1100° C. or higher. Considerable handling is necessary and this increases chances for introduction of impurities.

A more satisfactory procedure for producing alpha-alumina starts by exposure of aluminum isopropoxide to water vapor (suitably exposed on pans to moist air) to give an amorphous aluminum oxide hydroxide. The amorphous character is lost and the transitional forms gamma and theta alumina crystallize at 800° to 1,000° C. followed by conversion to alpha-alumina by calcining at 1,150° to about 1,375° C. A suitable calcination proceeds for 2 hours at 1,200° C. Material obtained in this way, may be referred to as calcined vapor-desolubilized alumina and is found microscopically to consist largely of particles averaging about 0.6 to 0.8 i.e., 0.5 to 1.0 microns, microns which may be somewhat agglomerated. Accordingly, grinding or comminution is necessary mainly to break up agglomerates. As noted above, small amounts of other oxides are easily incorporated before exposure of the aluminum isopropoxide to water vapor and are coprecipitated with the hydrated alumina to give calcined vapor-desolubilized aluminas solution-blended with desired percentages of additives. In such calcined compositions the magnesia may be present as spinel, possibly in solid solution at the very low concentrations employed, but it is conveniently expressed as percentages of MgO. It will be recognized that adjuvants equivalent to magnesia may also be incorporated or coprecipitated by these and analogous processes.

The process by which the alumina is prepared is described herein because it is found that alumina desolubilized in these ways from aluminum organic compounds and particularly from aluminum isopropoxide has properties which are especially advantageous in ceramics, namely, exceptional purity and freedom from alkali metals and other undesirable impurities, uniform small particle size and homogeneous distribution of adjuvant trace oxides.

Heretofore the traces of other oxides, or materials yielding them, have had to be mixed into the alumina by prolonged grinding. There is no really feasible method of determine when or if mixing is sufficient. It is now found that solution-blended alumina may advantageously contain relatively lower amounts of inorganic additives than were practical heretofore. The desired advantage is improved properties in the alumina ceramic. Ball milling is employed to incorporate organic grinding aids or materials for providing body such as oleic acid, ethylene glycol, triethanolamine, water, etc., and to break down relatively loose agglomerates in the ceramic base. Organic binders can also be employed as in the Park U.S. Pat. No. 2,966,719. Further reduction in particle size may be obtained by prolonged ball milling but is not normally necessary.

Because of the hardness of alumina (9 on Mohs' scale), the grinding operation must be effected using balls of the same type alumina, i.e., of extreme purity, to prevent contamination. A lining of rubber in the mill further reduces the extent to which contamination is picked up. Milling times may run from 2 to 20 hours using ball-to-charge proportions from 4:1 to 30:1. Naturally, high ratios and long times give the greatest milling and finest particle sizes. There is, however, somewhat greater, although still minute, contamination and milling of the calcined desolubilized alumina, whether including coprecipitated adjuvants or not, is preferably carried out for 8 to 12 hours at 10 to 20:1 ball-to-charge rations. In order to obtain ceramics of high-purity alumina, it is necessary that there be careful exclusion of contaminants whether in an added material, arising from equipment or accidentally introduced. Grinding aids which cause no contamination (i.e., having substantially no ash content) are added as desired, for example, in amounts of one-fourth to 1 percent. The dry-milled material is separated from the grinding balls, avoiding contamination, and may be dry pressed or isostatically pressed directly if desired.

It is preferred that the dry-ground material be combined with substantially ash free temporary solvent or water soluble or dispersed organic binders and lubricants such as paraffin, microcrystalline wax, polyvinyl alcohol, polyvinyl pyrolidone, polyalkylene glycols, acrylates or methacrylates, etc., many of which are available under various trade names, in amounts up to about 5 percent to provide easier compaction and working and less dusting. The mixing may be carried out by any convenient procedure using care to avoid contamination. This dry mix may be used directly or it may be granulated as described below or spray drying of a suspension may be used effectively.

The composition is formed by whatever methods of the art are desired or are convenient, e.g., dry pressing, isostatic pressing, extrusion, injection molding, or by dilution and casting into films.

Firing is conveniently effected in either gas-fired or electric furnaces. It is a particular advantage of these compositions that no special atmosphere is necessary. This may be because of the extreme purity or because of the complete homogeneity and have effective crystal-growth control. It does no harm, however, to use a furnace which may be flooded with hydrogen or which may operate under reduced pressure, i.e., vacuum. The firing sinters the particles into a monolithic structure in which the alumina has a density of greater than 3.91 g./cm.$^3$ or more which is above 98 percent of theoretical density. As noted above, comparisons of densities should be only between samples of closely similar composition after controlled manipulations.

The processes and compositions of the invention are further illustrated by the following examples in which parts are by weight where not otherwise specified and temperatures are in degrees centigrade.

EXAMPLE 1

Amorphous aluminum oxide hydroxide, that is desolubilized alumina hydroxide, containing less than 0.002 percent intrinsic metallic oxide impurities of all sorts as shown spectroscopically, i.e., 99.998 percent pure, obtained by vapor hydrolysis of aluminum isopropoxide, is calcined at 1,200° C. for 2 hours in air in an electrically heated furnace. Temperatures up to about 1,375° C. may be used and other furnaces may be used if desired. The product is found to be essentially particles of alpha-alumina of 0.5 to 1.0-micron size which in bulk tend to agglomerate in clumps. The calcined desolubilized alumina is ball milled for 10 hours with 1 percent of triethanolamine and 15 times its weight of high-purity alumina balls in a rubber-lined ball mill and then is further mixed with sufficient (8.0 percent) microcrystalline wax emulsion so that 3.5 percent of wax, based on the weight of alumina, is added. The composition may be used for pressing shapes if desired but preferably the batch is forced through a U.S. No. 60 (0.25 mm. square hole) sieve and dried to less than 1 percent water content to give granules or pellets which are essentially non-dusting and are useful for pressing green (unfired) alumina shapes.

Disks about 1.0 inch (2.5 cm.) in diameter and 0.25 inch (6.4 mm.) thick, useful as electrically insulating spacer pieces, are molded in a steel die under 20,000 p.s.i. pressure using 7.4 g. of the granules for each disk. The green density is 2.30 g./cm.$^3$. Representative disks are fired for 2 hours in gas-fired and electric furnaces at 1,500° and 1,550° C. respectively, giving 3.91 g./cm.$^3$ and 3.92 g./cm.$^3$ density. Average crystallite sizes of 3.25 and 5.50 microns respectively are measured microscopically. In these samples there was no control of crystal growth. Shrinkage is about 19 percent. The higher temperature appears to promote crystal growth.

EXAMPLE 2

Three batches of alumina are prepared as in example 1 except that polyvinyl alcohol (12 g. of a 25-percent solution per 100 g. of alumina to give 3-percent solids) is used instead of microcrystalline wax. Magnesium oxide is blended into each batch during the initial ball milling using 0.025 and 0.05 percent magnesium oxide as the carbonate in two batches and 0.05% MgO as spinel (the aluminate) in the third batch. Green densities and fired densities (sintered 2 hours in gas-fired furnace at 1,500° C.) are essentially identical (2.28 to 2.30 g./cm.$^3$ and 3.92 g./cm.$^3$ respectively). The crystallite sizes are 1.60, 1.38 and 1.61 microns respectively.

EXAMPLE 3

Example 1 is repeated except that amorphous aluminum oxide hydroxide is employed which is obtained by desolubilizing aluminum isopropoxide solution-blended with an amount of magnesium aluminum isopropoxide corresponding to 0.010% MgO. Calcination is carried out for 2 hours at 1,200° C. to give calcined desolubilized alumina solution-blended with 0.010 percent magnesia. The particles resemble those of example 1 in size and crystal form. X-ray analysis demonstrates that the material is essentially all alpha-alumina. The 0.010 percent magnesia which is added may be termed an extrinsic impurity in the aluminum since it is added deliberately and is distinct from the 0.002 percent of intrinsic impurities present as noted in example 1 above.

The calcined alumina is compounded with polyvinyl alcohol as described in example 2, granulated and dried. Disks are pressed from the nondusting granules obtained and fired as described there.

The same overall procedure is repeated employing alumina solution-blended to contain progressively higher amounts of magnesia, namely 0.25%, 0.05% and 0.10%. Sintering is for 2 hours in a gas-fired furnace at 1,500° C. The data on the solution-blended alumina disks are shown in the following tabulation.

| MgO content | 0.010 | 0.025 | 0.05 | 0.10 |
|---|---|---|---|---|
| Green density g./cm.$^3$ | 2.44 | 2.26 | | 2.40 |
| Fired density g./cm.$^3$ | 3.92 | 3.93 | | 3.93 |
| Average crystallite size, µ | 1.53 | 1.44 | 1.67 | 1.37 |

EXAMPLE 4

Solution-blended alumina containing 0.025% MgO as prepared above is compounded with microcrystalline wax (3.5-percent solids) and granulated as in example 1. Disks are formed with green density 2.22 g./cm.$^3$. Certain disks are fired for 2 hours at 1,500° C. in an electrically heated furnace to give average crystal size 1.15 microns and density 3.93 g./cm.$^3$. Others are fired at 1,450° C. in a gas-fired furnace to give 3.92 g./cm.$^3$ density and 1.49-micron average crystal size.

EXAMPLE 5

Calcined desolubilized alumina derived from aluminum isopropoxide containing no addition of MgO, and also from isopropoxide solution-blended to contain 0.010 and 0.10% MgO respectively, are produced, compounded with microcrystalline wax as organic binder, granulated and formed into disks as outlined in example 4. The disks are prefired at 800° C. for 2 hours in an air atmosphere to remove the wax binder, then fired for 2 hours at 1,500° C. in a hydrogen atmosphere to provide insulating disks characterized as shown in the following tabulation.

| MgO content | 0.000 | 0.010 | 0.100 |
|---|---|---|---|
| Green density g./cm.$^3$ | 2.27 | 2.40 | 2.38 |
| Fired density g./cm.$^3$ | 3.91 | 3.95 | 3.95 |
| Average crystallite size µ | 4.52 | 1.48 | 1.92 |

Substantially identical results are obtained using polyvinyl pyrrolidone or water-dispersed acrylates or methacrylates as temporary binders and granulating by spray-drying, for example, with alpha-alumina calcined at 1,350° C. and ball milled as described above.

What is claimed is:

1. The process for production of a green body consisting essentially of alpha-alumina containing 0.003 percent or less of intrinsic impurities comprising the steps of
   A. coprecipitating amorphous hydrated aluminum oxide containing magnesia from a composition consisting essentially of distilled aluminum isopropoxide with 0.01 to 0.1 percent on an oxides basis of magnesia in the form of an isopropoxide
   B. calcining said amorphous hydrated aluminum oxide to alpha-alumina at 1,100° C. to about 1,375° C. for about two hours, and
   C. grinding, while avoiding contamination, using from 0 to about 2 percent substantially ash-free grinding aid, sufficiently to break down agglomerates to give a dry ground powdered alpha-alumina having particle size, determined microscopically, averaging 0.5 to 1.0 microns, and further mixing, while continuing to avoid contamination, with not more than 10 percent of substantially ash-free temporary organic binder;

said green body firing in about 2 hours at 1,450° to 1,550° C. to high purity alumina having crystallite size of about 1–10 microns in average diameter as measured microscopically.

2. The process according to claim 1 wherein calcining temperature range is 1,200° to 1350° C.

3. The process according to claim 1 wherein about one-fourth to 1 percent of substantially ash-free grinding aid is employed in breaking down agglomerates and the amount of substantially ash-free temporary organic binder is 1–5 percent.

4. The process according to claim 1 wherein the temporary organic binder is microcrystalline wax.

5. The process according to claim 1 wherein the temporary organic binder is polyvinylalcohol.

6. The process according to claim 1 wherein the temporary organic binder is polyvinylpyrrolidone.

7. The process according to claim 1 wherein the temporary organic binder is water-dispersed acrylate or methacrylate.

8. The product of the process of claim 1 consisting essentially of alpha-alumina of high purity and magnesium oxide together with organic grinding aid and temporary binder.

* * * * *

UNITED STATES PATENT OFFICE
CERTIFICATE OF CORRECTION

Patent No. 3,637,406  Dated January 25, 1972

Inventor(s) Joseph T. Bailey

It is certified that error appears in the above-identified patent and that said Letters Patent are hereby corrected as shown below:

Column 2, line 71, after "desolubilized" insert --and after calcining is herein termed calcined desolubilized---.
Column 4, line 11, "determine" should read --determining--.
Column 5, line 69, "0.25%" should read --0.025%--
  line 75, third column in table is deleted, should read --2.25--.
Column 6, line 1, third column in table is deleted, should read --3.92--.

Signed and sealed this 12th day of September 1972.

(SEAL)
Attest:

EDWARD M. FLETCHER, JR.
Attesting Officer

ROBERT GOTTSCHALK
Commissioner of Patents